(12) United States Patent
Luo et al.

(10) Patent No.: US 12,302,227 B2
(45) Date of Patent: May 13, 2025

(54) ACCESS METHOD AND APPARATUS

(71) Applicant: HUAWEI TECHNOLOGIES CO., LTD., Guangdong (CN)

(72) Inventors: Hejia Luo, Hangzhou (CN); Xiaolu Wang, Hangzhou (CN); Jianwei Zhou, Hangzhou (CN); Chenlei Xu, Hangzhou (CN); Ying Chen, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 405 days.

(21) Appl. No.: 17/825,787

(22) Filed: May 26, 2022

(65) Prior Publication Data

US 2022/0286948 A1 Sep. 8, 2022

Related U.S. Application Data

(63) Continuation of application No. PCT/CN2020/133495, filed on Dec. 3, 2020.

(30) Foreign Application Priority Data

Dec. 6, 2019 (CN) .......................... 201911241336.6

(51) Int. Cl.
*H04W 48/16* (2009.01)
*H04B 7/185* (2006.01)

(52) U.S. Cl.
CPC ........ *H04W 48/16* (2013.01); *H04B 7/18513* (2013.01)

(58) Field of Classification Search
CPC .......................... H04B 7/18513; H04B 7/1851; H04B 7/1855; H04W 84/06; H04W 48/04;

(Continued)

(56) References Cited

U.S. PATENT DOCUMENTS 4,189,675 A * 2/1980 Frosch ................. H04B 7/2041
455/25
6,493,376 B1 * 12/2002 Harms ................. H04B 1/7075
375/E1.003

(Continued)

FOREIGN PATENT DOCUMENTS

CN 108064055 A 5/2018
CN 108093448 A 5/2018

(Continued)

OTHER PUBLICATIONS

3GPP TS 23.122 V16.3.0 (Sep. 2019), "3rd Generation Partnership Project; Technical Specification Group Core Network and Terminals; Non-Access-Stratum (NAS) Functions related to Mobile Station (MS) in Idle Mode (Release 16), "Sep. 2019, 75 pages.

(Continued)

*Primary Examiner* — Matthew C Sams
(74) *Attorney, Agent, or Firm* — Fish & Richardson P.C.

(57) ABSTRACT

The present disclosure relates to access methods and apparatuses. In one example method, a terminal device determines, based on whether a first frequency offset parameter is in a frequency offset parameter range, whether to access a first cell. If the first frequency offset parameter is in the frequency offset parameter range, a current location of the terminal device is not at an edge of the cell. Otherwise, the current location of the terminal device may be at the edge of the cell.

17 Claims, 10 Drawing Sheets

(58) Field of Classification Search
CPC ......... H04W 56/0035; H04W 56/0045; H04W 24/02; H04W 24/08; H04W 48/16; H04W 56/001; H04W 72/046; H04W 72/121; H04W 72/1268; H04W 72/23; H04W 74/0833; H04W 76/10; G01S 19/256; G01S 19/258; G01S 5/0246; G01S 5/12; H04L 27/261; H04L 27/2646; H04L 27/2657

See application file for complete search history.

(56) References Cited

U.S. PATENT DOCUMENTS

| | | | | |
|---|---|---|---|---|
| 10,959,201 | B2* | 3/2021 | Wang | H04B 7/18513 |
| 2015/0078334 | A1* | 3/2015 | Peruru | H04W 48/16 370/328 |
| 2016/0234761 | A1 | 8/2016 | Chong et al. | |
| 2018/0254825 | A1* | 9/2018 | Speidel | H04B 7/2125 |
| 2019/0313357 | A1* | 10/2019 | Wang | H04W 56/0045 |
| 2020/0313754 | A1* | 10/2020 | Wang | H04W 72/121 |
| 2022/0330191 | A1* | 10/2022 | Shin | G01S 19/256 |

FOREIGN PATENT DOCUMENTS

| | | | | |
|---|---|---|---|---|
| CN | 108243391 | A | | 7/2018 |
| CN | 108632926 | A | | 10/2018 |
| CN | 110012519 | A | | 7/2019 |
| CN | 112929899 | A | * 6/2021 | ......... H04B 7/18513 |
| GB | 2352347 | A | * 1/2001 | ............... G01S 5/12 |

OTHER PUBLICATIONS

3GPP TS 38.101-1 V15.7.0 (Sep. 2019), "3rd Generation Partnership Project; Technical Specification Group Radio Access Network; NR; User Equipment (UE) Radio Transmission and Reception; Part 1: Range 1 Standalone (Release 15)," Sep. 2019, 234 pages.

3GPP TS 38.304 V15.5.0 (Sep. 2019), "3rd Generation Partnership Project; Technical Specification Group Radio Access Network; NR; User Equipment (UE) Procedures in Idle Mode and RRC Inactive State (Release 15)," Sep. 2019, 29 pages.

3GPP TS 38.331 V15.7.0 (Sep. 2019), "3rd Generation Partnership Project; Technical Specification Group Radio Access Network; NR; Radio Resource Control (RRC) Protocol Specification (Release 15)," Sep. 2019, 527 pages.

Office Action issued in Chinese Application No. 201911241336.6 on Jul. 5, 2022, 19 pages (with English translation).

PCT International Search Report and Written Opinion issued in International Application No. PCT/CN2020/133495 on Feb. 22, 2021, 15 pages (with English translation).

Ericsson et al., "On NTN Synchronization, Random Access, and Timing Advance," 3GPP TSG-RAN WG1 Meeting #99, Reno, USA, Nov. 18-22, 2019, R1-1912725, 22 pages.

Catt et al., "Views on NTN WI in Rel-17," 3GPP TSG-RAN Meeting #86, Sitges, Spain, Dec. 9-12, 2019, RP-192866, 3 pages.

Extended European Search Report in European Appln No. 20897538.3, dated Dec. 13, 2022, 9 pages.

* cited by examiner

ACCESS METHOD AND APPARATUS

CROSS-REFERENCE TO RELATED APPLICATIONS

This application is a continuation of International Patent Application No. PCT/CN2020/133495, filed on Dec. 3, 2020, which claims priority to Chinese Patent Application No. 201911241336.6, filed on Dec. 6, 2019. The disclosures of the aforementioned applications are hereby incorporated by reference in their entireties.

TECHNICAL FIELD

This application relates to the satellite communication field, and more specifically, to an access method and apparatus in the satellite communication field.

BACKGROUND

In a cellular communication technology, a terminal device needs to access a network device when signal quality is good. In this way, communication quality is good after the terminal device accesses the network device, and it can be ensured that no handover is performed immediately after the terminal device accesses the network device.

In the cellular communication technology, the terminal device determines, by using an S criterion (corresponding to a signal received power parameter), whether communication quality of the network device meets an access condition. If the access condition is met, the terminal device accesses the network device. If the access condition is not met, the terminal device does not access the network device. Generally, if the terminal device is located at an edge of a cell covered by the network device, the S criterion cannot be easily met. If the terminal device is located at a central location of the cell covered by the network device, the S criterion can be easily met.

In the cellular communication technology, a height of a cellular base station is small compared with a height of a satellite base station in a satellite communication technology. In the cellular communication technology, signal quality of a central location and that of an edge location of a cell covered by the cellular base station have obvious difference. In the satellite communication technology, signal quality of a central location and that of an edge location of a plurality of cells covered by the satellite base station have no obvious difference, and even the signal quality of the central location and that of the edge location of the cell is the same. In this way, if the S criterion in the cellular communication technology is used to manage access in the satellite communication technology, even a terminal device located at an edge of a cell meets the S criterion and accesses the cell. In this case, after the terminal device just accesses the cell, the terminal device is out of a coverage area of the cell due to movement of the satellite base station, and information about the cell cannot be received. Therefore, handover or reselection needs to be performed. In other words, handover or reselection needs to be performed just after the terminal device accesses the cell. This causes high signaling overheads.

SUMMARY

This application provides an access method and apparatus, to reduce signaling overheads.

According to a first aspect, an access method is provided, including: A terminal device receives frequency configuration information sent by a satellite base station by using a first cell. The frequency configuration information indicates a frequency offset parameter range of the first cell.

The terminal device determines the frequency offset parameter range of the first cell based on the frequency configuration information.

The terminal device determines a first frequency offset parameter based on a detected first reference signal.

The terminal device determines, based on whether the first frequency offset parameter is in the frequency offset parameter range, whether to access the first cell.

In the foregoing solution, the terminal device may determine, based on whether the first frequency offset parameter is in the frequency offset parameter range, whether to access the first cell. To some extent, the frequency offset parameter range can reflect, whether the terminal device is located at an edge location of the first cell. If the first frequency offset parameter is in the frequency offset parameter range, a current location of the terminal device is not at an edge of the cell. If the first frequency offset parameter is not in the frequency offset parameter range, the current location of the terminal device may be at the edge of the cell. In this way, the terminal device may determine, based on whether the first frequency offset parameter is in the frequency offset parameter range, whether to access the first cell. This can avoid signaling overheads caused when handover or reselection needs to be performed immediately after the terminal device needs to access the first cell even if the terminal device is located at the edge location of the first cell but an S criterion is met.

It should be noted that, in this application, the frequency configuration information may alternatively be Doppler configuration information, and the Doppler configuration information indicates a Doppler parameter offset range of the first cell. Correspondingly, the first frequency offset parameter may alternatively be a first Doppler parameter. The first Doppler parameter may include a first Doppler offset value and/or a first change rate of a Doppler offset value that changes with time.

Access mentioned in this application may be random access, establishing an RRC connection, or access initiated because of cell handover.

In some implementations, that the terminal device determines, based on whether the first frequency offset parameter is in the frequency offset parameter range, whether to access the first cell includes:

If the first frequency offset parameter is in the frequency offset parameter range, the terminal device accesses the first cell.

If the first frequency offset parameter is not in the frequency offset parameter range, the terminal device does not access the first cell.

In some possible implementations, the method further includes: The terminal device determines a second frequency offset parameter based on a detected second reference signal. That the terminal device determines, based on whether the first frequency offset parameter is in the frequency offset parameter range, whether to access the first cell includes: If the first frequency offset parameter is not in the frequency offset parameter range, the terminal device determines, based on a value relationship between an absolute value of the first frequency offset parameter and an absolute value of the second frequency offset parameter, whether to access the first cell.

In some possible implementations, the frequency configuration information indicates that the frequency offset parameter range of the first cell is a frequency offset value range and/or a change rate range of a frequency offset value that changes with time.

In some possible implementations, if the frequency configuration information indicates that the frequency offset parameter range of the first cell is the frequency offset value range, the frequency offset value range is that the frequency offset value is greater than a first frequency offset threshold, and the first frequency offset parameter is a first frequency offset value. The terminal device determines the first frequency offset parameter range of the first cell based on the frequency configuration information. The terminal device determines, based on the frequency configuration information, that the first frequency offset parameter range is greater than the first frequency offset threshold.

In some possible implementations, if the frequency configuration information indicates that the frequency offset parameter range of the first cell is the change rate range of the frequency offset value that changes with time, the change rate range is greater than a first change rate threshold, and the first frequency offset parameter is a first change rate of the frequency offset value that changes with time.

That the terminal device determines the first frequency offset parameter range of the first cell based on the frequency configuration information includes:

The terminal device determines, based on the frequency configuration information, that the first frequency offset parameter range is greater than the first change rate threshold.

In some possible implementations, the frequency configuration information indicates that the frequency offset parameter range of the first cell is an intersection between the frequency offset value range and the change rate range of the frequency offset value that changes with time. The frequency offset value range is that the frequency offset value is greater than a second frequency offset threshold, and the change rate range of the frequency offset value that changes with time is greater than a second change rate threshold. The first frequency offset parameter is a first frequency offset value and a first change rate of the frequency offset value that changes with time.

That the terminal device determines the first frequency offset parameter range of the first cell based on the frequency configuration information includes: The terminal device determines, based on the frequency configuration information, that the first frequency offset parameter range is an intersection between the frequency offset value that is greater than the second frequency offset threshold and a change rate of the frequency offset value that changes with time and that is greater than the second change rate threshold.

In some possible implementations, the frequency configuration information indicates that the frequency offset parameter range of the first cell is an intersection between a frequency offset value that is greater than a third frequency offset threshold and less than a fourth frequency offset threshold and a change rate of the frequency offset value that changes with time and that is greater than a third change rate threshold and less than a fourth change rate threshold. The frequency offset value is greater than the fourth frequency offset threshold. The first frequency offset parameter is a first frequency offset value and a first change rate of the frequency offset value that changes with time.

That the terminal device determines the frequency offset parameter range of the first cell based on the frequency configuration information includes: The terminal device determines, based on the frequency configuration information, that the first frequency offset parameter range is the intersection between the frequency offset value that is greater than the third frequency offset threshold and less than the fourth frequency offset threshold and the change rate of the frequency offset value that changes with time and that is greater than the third change rate threshold and less than the fourth change rate threshold. The frequency offset value is greater than the fourth frequency offset threshold.

In some possible implementations, the frequency configuration information indicates that the frequency offset parameter range of the first cell is the intersection between the frequency offset value range and the change rate range of the frequency offset value that changes with time. The frequency offset value range is that the frequency offset value is greater than a fifth frequency offset threshold, and the change rate range of the frequency offset value that changes with time is less than a fifth change rate threshold. The first frequency offset parameter is the first frequency offset value and the first change rate of the frequency offset value that changes with time.

That the terminal device determines the first frequency offset parameter range of the first cell based on the frequency configuration information includes: The terminal device determines, based on the frequency configuration information, that the first frequency offset parameter range is an intersection between the frequency offset value that is greater than the fifth frequency offset threshold and a change rate of the frequency offset value that changes with time and that is less than the fifth change rate threshold. In some possible implementations, if the frequency configuration information indicates that the frequency offset parameter range of the first cell is the change rate range of the frequency offset value that changes with time, the change rate range is less than a sixth change rate threshold, and the first frequency offset parameter is the first change rate of the frequency offset value that changes with time.

That the terminal device determines the first frequency offset parameter range of the first cell based on the frequency configuration information includes:

The terminal device determines, based on the frequency configuration information, that the first frequency offset parameter range is less than the sixth change rate threshold.

According to a second aspect, an access method is provided, including: A satellite base station determines frequency configuration information of a first cell in at least one cell. The frequency configuration information of the first cell indicates a frequency offset parameter range of the first cell.

The satellite base station sends the frequency configuration information of the first cell to a terminal device in the first cell by using the first cell.

In the solution of this application, the satellite base station may configure different Doppler configuration information for different cells, and a terminal device in each cell determines a frequency offset parameter range based on received frequency configuration information. The terminal device in each cell determines a frequency offset parameter based on a received reference signal, and the terminal device determines, based on whether the frequency offset parameter is in the frequency offset parameter range, whether to access the cell.

In some possible implementations, the frequency configuration information indicates that the frequency offset parameter range of the first cell is a frequency offset value range and/or a change rate range of a frequency offset value that changes with time.

In some possible implementations, if the frequency configuration information indicates that the frequency offset parameter range of the first cell is the frequency offset value range, the frequency offset value range is that the frequency offset value is greater than a first frequency offset threshold.

In some possible implementations, if the frequency configuration information indicates that the frequency offset parameter range of the first cell is the change rate range of the frequency offset value that changes with time, the change rate range of the frequency offset value that changes with time is greater than a first change rate threshold.

In some possible implementations, the frequency configuration information indicates that the frequency offset parameter range of the first cell is an intersection between the frequency offset value range and the change rate range of the frequency offset value that changes with time.

The frequency offset value range is greater than a second frequency offset threshold, and the change rate range of the frequency offset value that changes with time is greater than a second change rate threshold.

In some possible implementations, the frequency configuration information indicates that the frequency offset parameter range of the first cell is an intersection between a frequency offset value that is greater than a third frequency offset threshold and less than a fourth frequency offset threshold and a change rate of a frequency offset value that changes with time and that is greater than a third change rate threshold and less than a fourth change rate. The frequency offset value is greater than the fourth frequency offset threshold.

In some possible implementations, the frequency configuration information indicates that the frequency offset parameter range of the first cell is the intersection between the frequency offset value range and the change rate range of the frequency offset value that changes with time. The frequency offset value range is that the frequency offset value is greater than a fifth frequency offset threshold, and the change rate range of the frequency offset value that changes with time is less than a fifth change rate threshold.

In some possible implementations, if the frequency configuration information indicates that the frequency offset parameter range of the first cell is the change rate range of the frequency offset value that changes with time, the change rate range is less than a sixth change rate threshold.

According to a third aspect, an access apparatus is provided, and the apparatus is configured to perform the method in the first aspect or any possible implementation of the first aspect. The apparatus may include a unit configured to perform the method in the first aspect or any possible implementation of the first aspect.

According to a fourth aspect, an access apparatus is provided, and the apparatus is configured to perform the method in the second aspect or any possible implementation of the second aspect. The apparatus may include a unit configured to perform the method in the second aspect or any possible implementation of the second aspect.

According to a fifth aspect, a communication apparatus is provided. The communication apparatus includes a processor, the processor is coupled to a memory, the memory is configured to store a computer program or instructions, and the processor is configured to execute the computer program or the instructions stored in the memory, so that the method in the first aspect is performed.

For example, the processor is configured to execute the computer program or the instructions stored in the memory, and the communication apparatus is enabled to perform the method in the first aspect.

Optionally, the communication apparatus includes one or more processors.

Optionally, the communication apparatus may further include a memory coupled to the processor.

Optionally, the communication apparatus may include one or more memories.

Optionally, the memory and the processor may be integrated together, or may be separately disposed.

Optionally, the communication apparatus may further include a transceiver.

According to a sixth aspect, a communication apparatus is provided. The communication apparatus includes a processor, the processor is coupled to a memory, the memory is configured to store a computer program or instructions, and the processor is configured to execute the computer program or the instructions stored in the memory, so that the method in the second aspect is performed.

For example, the processor is configured to execute the computer program or the instructions stored in the memory, and the communication apparatus is enabled to perform the method in the second aspect.

Optionally, the communication apparatus includes one or more processors.

Optionally, the communication apparatus may further include a memory coupled to the processor.

Optionally, the communication apparatus may include one or more memories.

Optionally, the memory and the processor may be integrated together, or may be separately disposed.

Optionally, the communication apparatus may further include a transceiver.

According to a seventh aspect, this application provides a communication system. The system includes the apparatus provided in the third aspect and the apparatus provided in the fourth aspect; or the system includes the apparatus provided in the fifth aspect and the apparatus provided in the sixth aspect.

According to an eighth aspect, a computer-readable storage medium is provided, and the computer-readable storage medium stores a computer program (which may also be referred to as instructions or code) used to implement the method in the first aspect.

For example, when the computer program is run by a computer, the computer is enabled to perform the method in the first aspect. The computer may be a communication apparatus.

According to a ninth aspect, a computer-readable storage medium is provided. The computer-readable storage medium stores a computer program (or may be referred to as instructions or code) configured to implement the method in the first aspect or the second aspect.

For example, when the computer program is run by a computer, the computer is enabled to perform the method in the second aspect. The computer may be a communication apparatus.

According to a tenth aspect, this application provides a chip, including a processor. The processor is configured to read and execute a computer program stored in a memory, to perform the method in the first aspect or any possible implementation of the first aspect.

Optionally, the chip further includes a memory, and the memory and the processor are connected to the memory by using a circuit or a wire.

Further, optionally, the chip further includes a communication interface.

According to an eleventh aspect, this application provides a chip, including a processor. The processor is configured to read and execute a computer program stored in a memory, to perform the method in the first aspect or any possible implementation of the second aspect.

Optionally, the chip further includes a memory, and the memory and the processor are connected to the memory by using a circuit or a wire.

Further, optionally, the chip further includes a communication interface.

According to a twelfth aspect, this application provides a computer program product. The computer program product includes a computer program (which may also be referred to as instructions or code), and when the computer program is executed by a computer, the computer is enabled to implement the method in the first aspect. The computer may be a communication apparatus.

According to a thirteenth aspect, this application provides a computer program product. The computer program product includes a computer program (which may also be referred to as instructions or code), and when the computer program is executed by a computer, the computer is enabled to implement the method in the second aspect. The computer may be a communication apparatus.

DETAILED DESCRIPTION OF EMBODIMENTS

The following describes technical solutions of this application with reference to the accompanying drawings.

Figure 1:
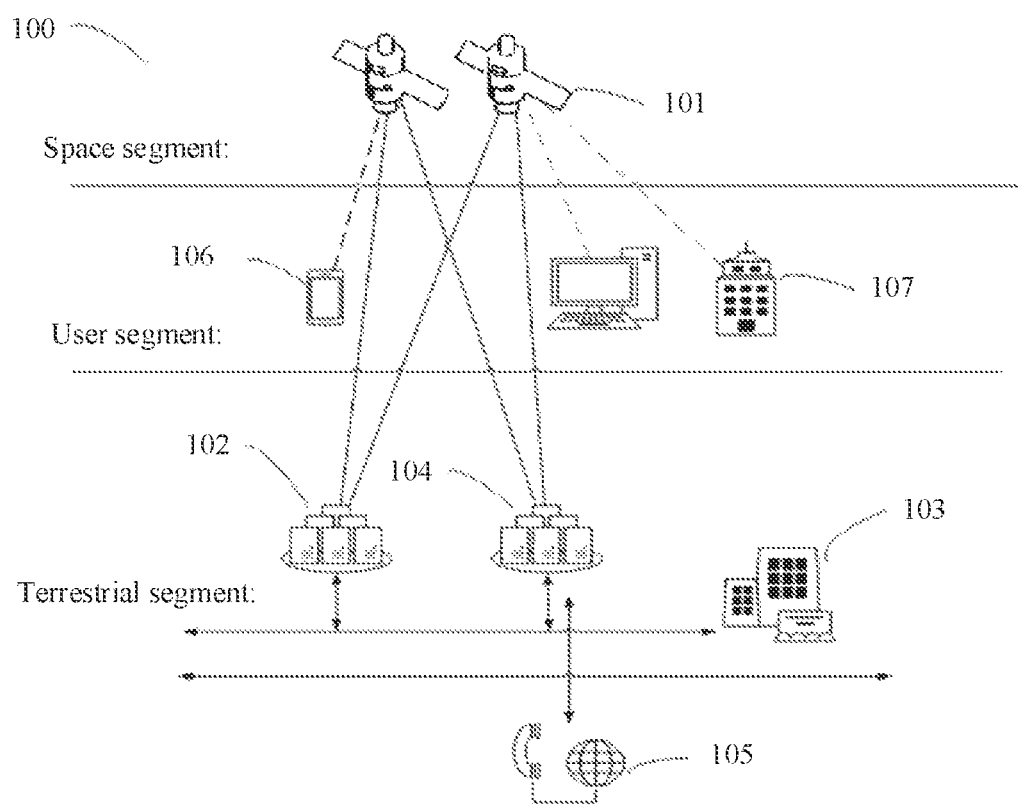
FIG. 1 is a schematic diagram of an application scenario according to an embodiment of this application.

The technical solutions of this application may be applied to a satellite communication system. FIG. 1 is a schematic diagram of an architecture of a satellite communication system. The satellite communication system 100 usually includes three parts; a space segment, a terrestrial segment, and a user segment. The space segment may include a geostationary earth orbit (GEO) satellite, a none-geostationary earth orbit (NGEO) satellite, or a plurality of satellite networks 101 including the geostationary earth orbit satellite and the none-geostationary earth orbit satellite. The terrestrial segment usually includes a satellite measurement and control center 102, a network control center (NCC) 103, various gateway stations 104, and the like. The gateway station is alternatively referred to as a gateway station. The network control center is also referred to as a system control center (SCC). The user segment includes various terminal devices. The terminal device may be various mobile terminals 106, such as a mobile satellite phone, or may be various fixed terminals 107, such as a terrestrial communication station. A dashed line in FIG. 1 indicates a communication signal between a satellite and a terminal. A solid line refers to a communication signal between a satellite and a device in the terrestrial segment. A bi-directional arrow line refers to a communication signal between network elements in the terrestrial segment. In the satellite communication system, a satellite may also be referred to as a satellite base station. In FIG. 1, the satellite base station may transmit downlink data to a terminal device. The downlink data may be transmitted to the terminal device after channel coding and modulation mapping are performed on the downlink data. The terminal device may also transmit uplink data to the satellite base station. The uplink data may also be transmitted to the satellite base station after channel coding and modulation mapping are performed on the uplink data. That the satellite base station communicates with the terminal device may be understood as: The satellite base station communicates with the terminal device by using a cell covered by the satellite base station.

The satellite measurement and control center 102 in the terrestrial segment has functions such as maintaining, monitoring, and controlling an orbital position and a posture of the satellite, and managing an ephemeris of the satellite. The network control center 103 has a user registration processing function, an identity acknowledgement function, a charging function, and another network management function. In some satellite mobile communication systems, the network control center 103 and the satellite measurement and control center 102 are combined. The gateway 104 has functions such as call processing, switching, and interface with a terrestrial communication network. The terrestrial communication network 105 is a part of the terrestrial segment of the satellite network, and is configured to switch a data packet of a satellite to a core network and send the data packet to a final terminal device. The terrestrial communication network may be a public switched telephone network (PSTN), a public land mobile network (PLMN), or various other dedicated networks. Different terrestrial communication networks require the gateway station to have different gateway functions.

In some satellite communication systems, the space segment of the satellite communication system may be a multi-layer structure including a management satellite and one or more service satellites. In networking of the multi-layered satellite communication system, the space segment may include one or more management satellites and serving satellites managed by these management satellites. The satellite or the satellite base station mentioned in this application is not limited to the managing satellite or the service satellite.

The satellite base station and the terminal device communicate by using a communication system that includes but is not limited to the following: a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or new radio (NR).

In this embodiment of this application, the terminal device needs to access a mobile satellite communication network by using the terrestrial segment of the satellite communication system to perform mobile communication. The terminal device may be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved PLMN. A terminal device represented by a satellite phone or an in-vehicle satellite system may directly communicate with a satellite. A fixed terminal represented by a terrestrial communication station can communicate with a satellite only after being relayed by a terrestrial station. A wireless transceiver antenna is installed on the terminal device to set and obtain a communication status, to complete communication.

Figure 2:
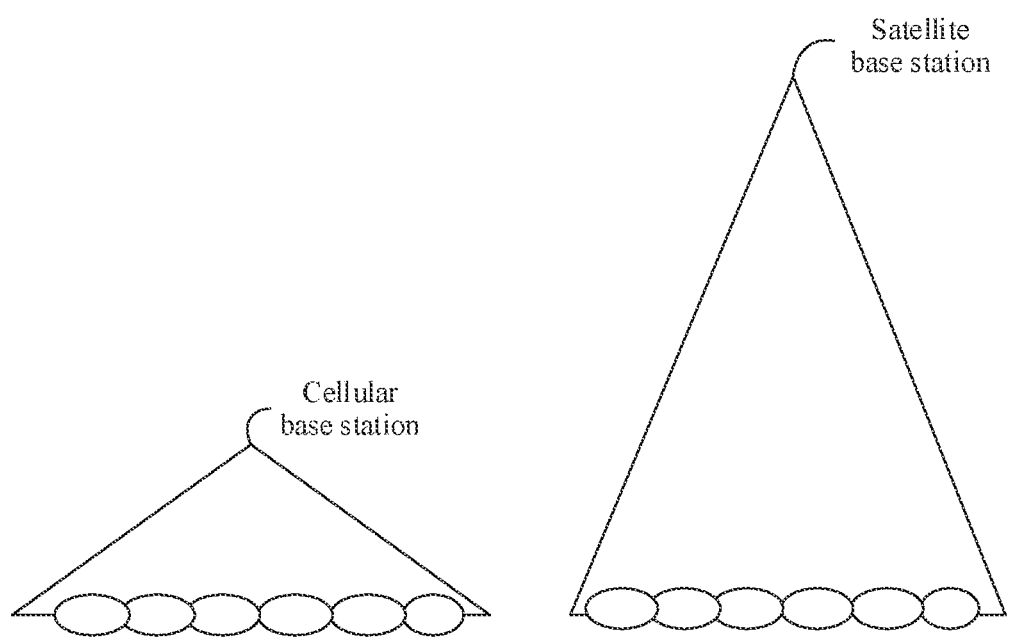
FIG. 2 is a schematic diagram of a cell covered by a satellite and a cell covered by a base station according to an embodiment of this application.
Figure 3:
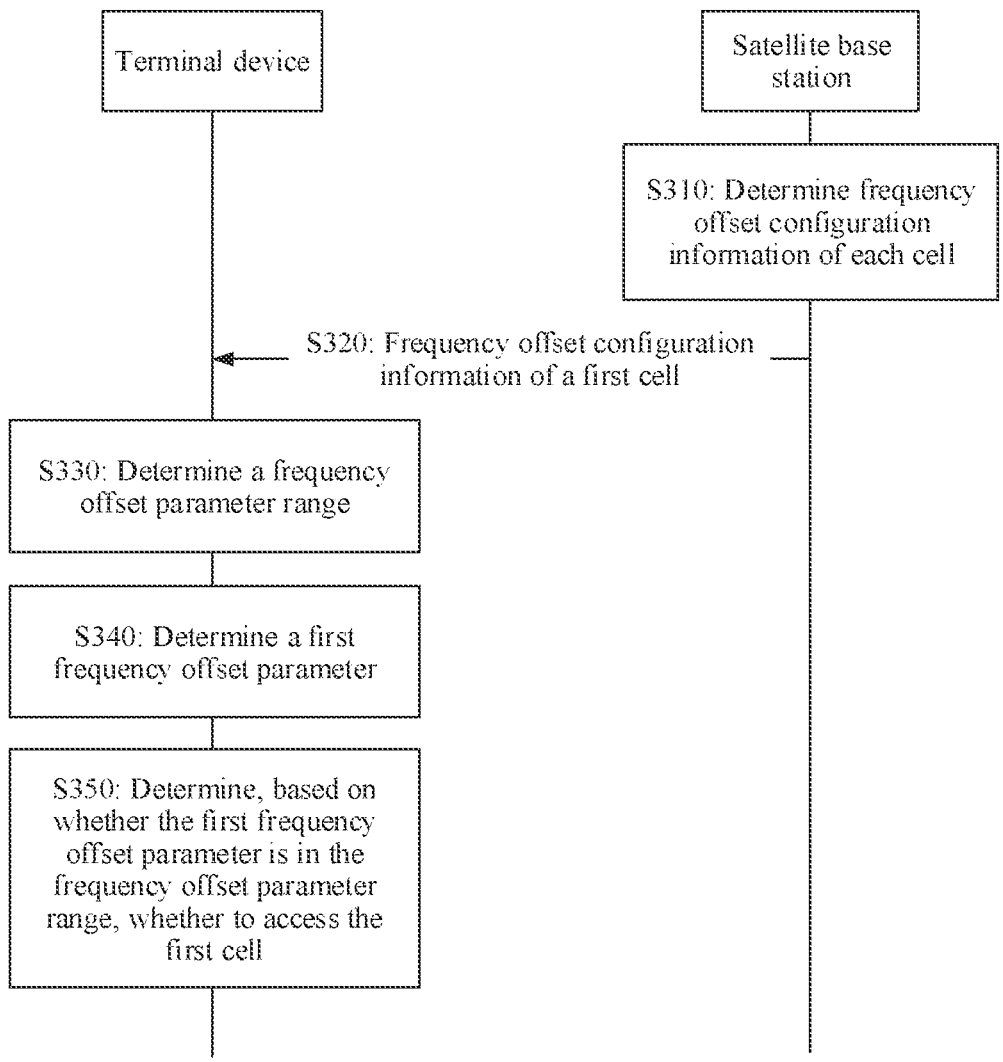
FIG. 3 is a schematic diagram of an access method according to an embodiment of this application.

Before communicating with the satellite base station, the terminal device needs to first access the satellite base station. In a cellular communication technology, the terminal device needs to determine, by using an S criterion, whether to access a cellular base station. The S criterion is related to a received power of a reference signal, and the terminal device determines, based on the detected received power of the reference signal, whether the S criterion is met. If the S criterion is met, a cell covered by the cellular base station is accessed; and if the S criterion is not met, the cell covered by the cellular base station is not accessed. As shown in FIG. 2, in a satellite communication technology, a radius of a cell covered by a satellite may be negligible relative to a height of a satellite base station. Unlike the satellite communication technology, in a cellular communication technology, a radius of a cell covered by a cellular base station may not be negligible relative to a height of the cellular base station. In other words, in the cellular communication technology, if a terminal device is located at an edge of the cell covered by the cellular base station, signal quality deteriorates, and an S criterion is used to determine that the cell cannot be accessed. In the satellite communication technology, if the terminal device is located at an edge of the cell covered by the satellite base station, signal quality does not deteriorate, and the S criterion is used to determine that the cell can also be accessed. In this way, the terminal device may need to perform handover or reselection just after accessing one cell, which causes unnecessary signaling overheads.

The following describes an access method 300 provided in an embodiment of this application with reference to an embodiment. The method includes the following steps.

S310: A satellite base station determines frequency offset configuration information of each cell in at least one cell. The following uses a first cell as an example for description.

The satellite base station needs to configure different frequency configuration information for different cells, and the satellite base station may determine the frequency configuration information of each cell based on a shape of an area divided by the at least one cell based on an equal-frequency offset value line and a change rate line of an equal-frequency offset value that changes with time.

Figure 4:
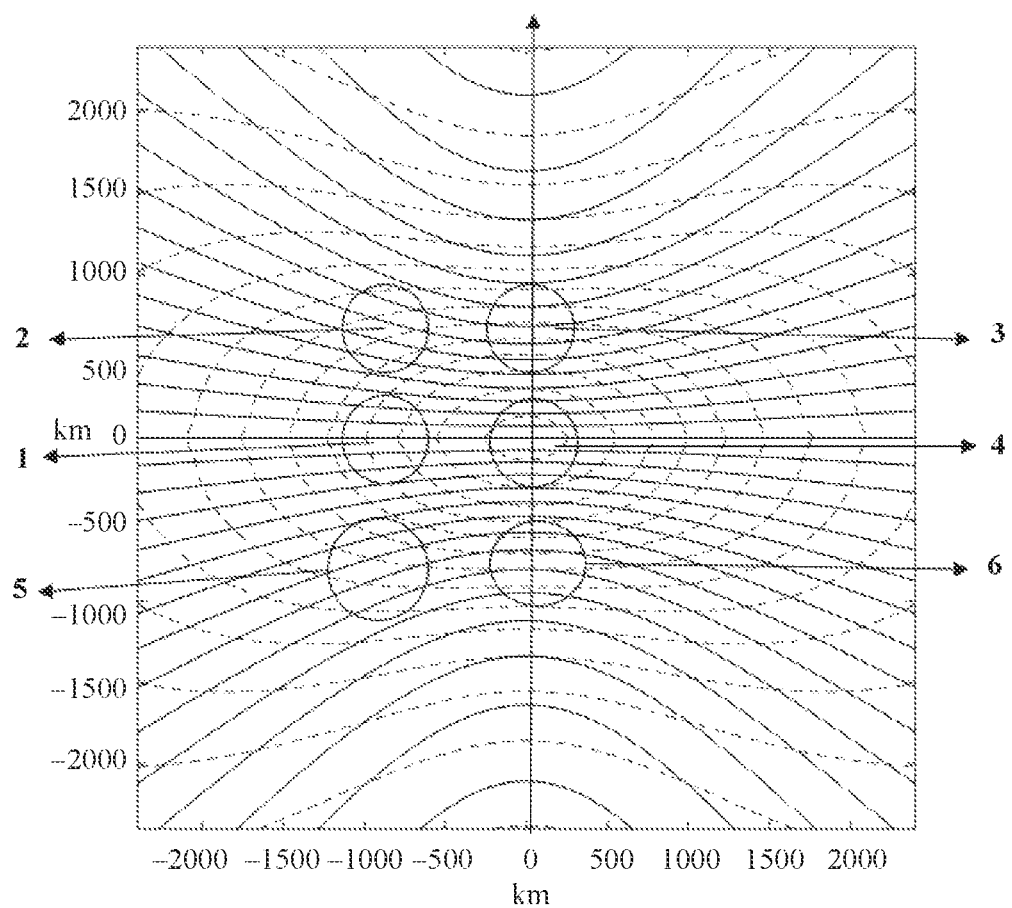
FIG. 4 to FIG. 9 are schematic diagrams of an equal-frequency offset value line and a change rate line of an equal-frequency offset value that changes with time according to an embodiment of this application.

The following uses five typical cases as an example for discussion. Different frequency configuration information may be configured for several types of cells identified as 1, 2, 3, 4, 5, and 6 in FIG. 4. In FIG. 4, a solid line is an equal-frequency offset value line, and a dashed line is a change rate line of an equal-frequency offset value that changes with time. A line in FIG. 4 is a schematic diagram in which a contour is mapped onto the ground.

Figure 5:
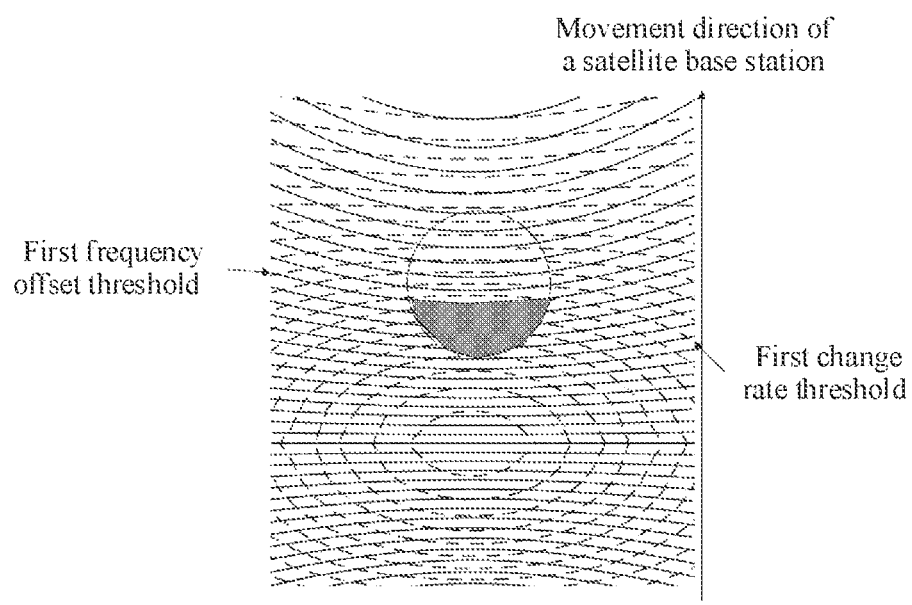

Case 1: In FIG. 4, the cell identified as 3 or 4 is divided into a plurality of bar areas based on the equal-frequency offset value line and the change rate line of an equal-frequency offset value that changes with time in the cell. If the first cell is a cell similar to the cell identified as 3 and 4, the frequency configuration information that may be configured by the satellite base station indicates that a frequency offset parameter range of the first cell is a frequency offset value range. The frequency offset value range is that a frequency offset value is greater than a first frequency offset threshold. Alternatively, the frequency configuration information indicates that the frequency offset parameter range of the first cell is a change rate range of the frequency offset value that changes with time. The change rate range is greater than a first change rate threshold, as shown in FIG. 5.

Figure 6:
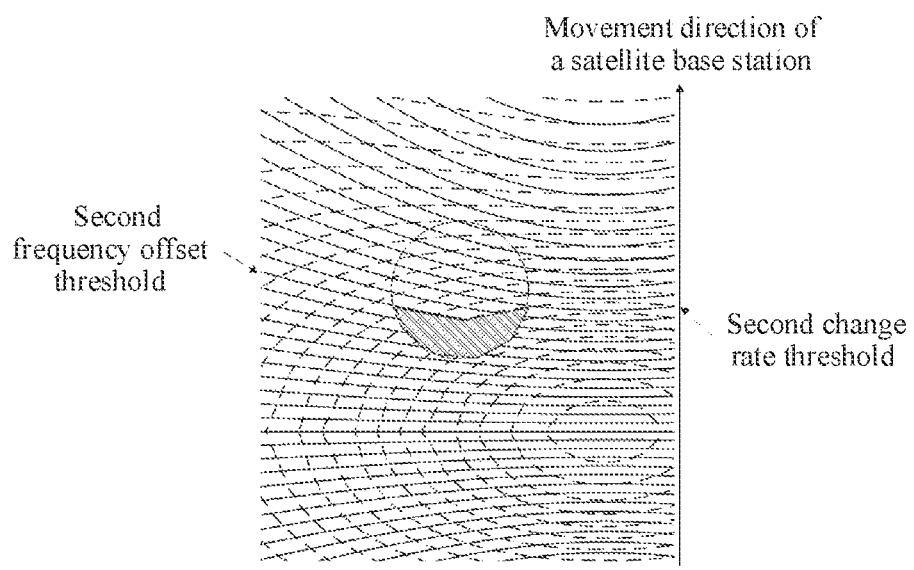

Case 2: In FIG. 4, the cell identified as 2 is divided into a plurality of approximately diamond-shaped areas based on the frequency offset value line and the change rate line of the equal-frequency offset value that changes with time. If the first cell is similar to the cell identified as 2, the frequency configuration information that may be configured by the satellite base station indicates that the frequency offset parameter range of the first cell is an intersection between the frequency offset value range and the change rate range of the frequency offset value that changes with time. The frequency offset value range is greater than a second frequency offset threshold, and the change rate range of the frequency offset value that changes with time is greater than a second change rate threshold, as shown in FIG. 6.

Figure 7:
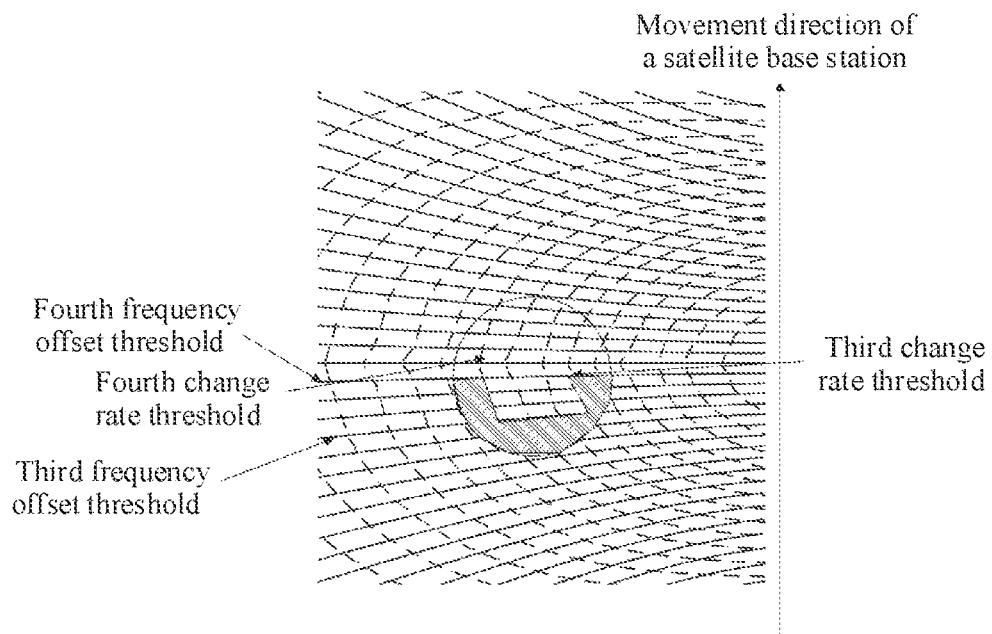

Case 3: In FIG. 4, the cell identified as 1 is divided into a plurality of approximately rectangular areas based on the equal-frequency offset value line and the change rate line of the equal-frequency offset value that changes with time. If the first cell satellite is similar to the cell identified as 1, the frequency configuration information that may be configured by the satellite base station indicates that the frequency offset parameter range of the first cell is an intersection between the frequency offset value that is greater than a third frequency offset threshold and less than a fourth frequency offset threshold and a change rate of the frequency offset value that changes with time and that is greater than a third change rate threshold and less than a fourth change rate threshold. The frequency offset value is greater than the fourth frequency offset threshold, and a fourth change rate threshold is greater than the third change rate threshold, as shown in FIG. 7.

Figure 8:
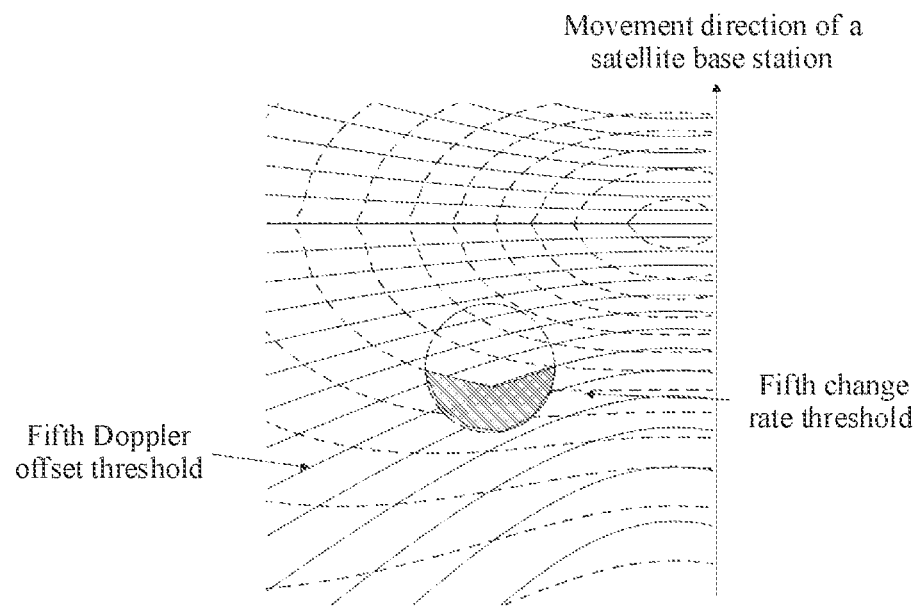

Case 4: In FIG. 4, the cell identified as 5 is divided into a plurality of approximately diamond-shaped areas based on the frequency offset value line and the change rate line of the equal-frequency offset value that changes with time. If the first cell is similar to the cell identified as 5, the frequency configuration information that may be configured by the satellite base station indicates that the frequency offset parameter range of the first cell is the intersection between the frequency offset value range and the change rate range of the frequency offset value that changes with time. The frequency offset value range is greater than a fifth frequency offset threshold, and the change rate range of the frequency offset value that changes with time is less than a fifth change rate threshold, as shown in FIG. 8.

Figure 9:
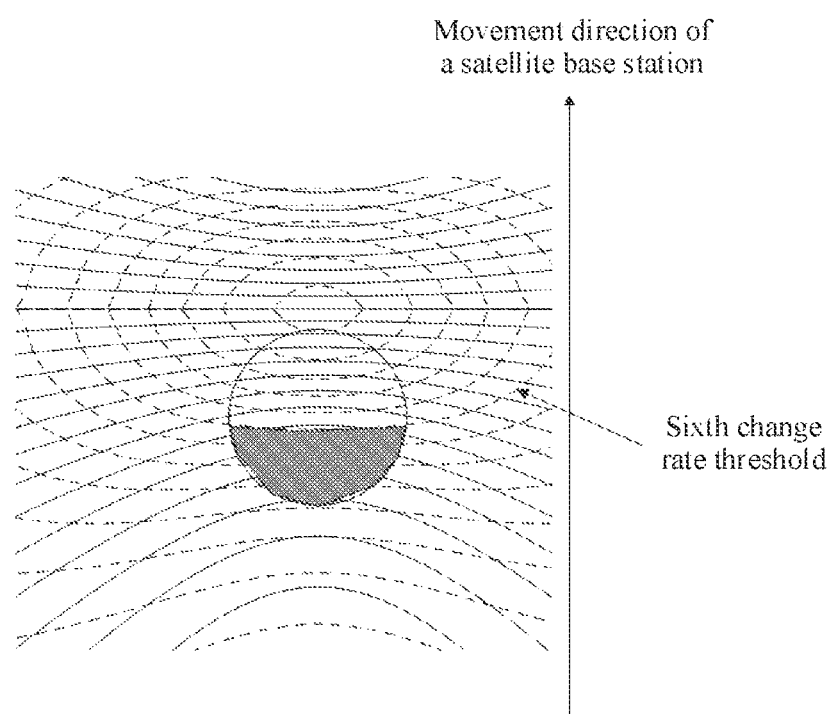

Case 5: In FIG. 4, the cell identified as 6 is divided into a plurality of bar areas based on the frequency offset value line and the change rate line of the equal-frequency offset value that changes with time in the cell. If the first cell is a cell similar to the cell identified as 6, the frequency configuration information that may be configured by the satellite base station indicates that the frequency offset parameter range of the first cell is the change rate range of the frequency offset value that changes with time, and the change rate range is less than a sixth change rate threshold, as shown in FIG. 9.

S320: The satellite base station sends the frequency offset configuration information of the first cell to a terminal device by using the first cell, where the frequency configuration information indicates the frequency offset parameter range of the first cell.

Correspondingly, the terminal device receives the frequency configuration information sent by the satellite base station by using the first cell.

S330: The terminal device determines, based on the received frequency offset configuration information, the frequency offset parameter range of the first cell in which the terminal device is located.

For the case 1, S330 includes: The terminal device determines that the frequency offset parameter range of the first cell is that the frequency offset value is greater than the first frequency offset threshold. Alternatively, the frequency offset parameter range of the first cell is that the change rate range of the frequency offset value that changes with time is greater than the first change rate threshold.

For the case 2, S330 includes: The terminal device determines that the frequency offset parameter range of the first cell is an intersection between the frequency offset value that is greater than the second frequency offset threshold and the change rate range of the frequency offset value that changes with time and that is greater than the second change rate threshold.

For the case 3, S330 includes: The terminal device determines that the frequency offset parameter range of the first cell is an intersection between the frequency offset value that is greater than the third frequency offset threshold and less than the fourth frequency offset threshold and the change rate range of the frequency offset value that changes with time and that is greater than the third change rate threshold and less than the fourth change rate threshold, and the frequency offset value is greater than the fourth frequency offset threshold.

For the case 4. S330 includes: The terminal device determines that the frequency offset parameter range of the first cell is an intersection between the frequency offset value that is greater than the fifth frequency offset threshold and the change rate range of the frequency offset value that changes with time and that is less than the fifth change rate threshold.

For the case 5, S330 includes: The frequency offset parameter range of the first cell is that the change rate of the frequency offset value that changes with time is less than the sixth change rate threshold.

S340: The terminal device detects a reference signal, and if detecting a first reference signal, the terminal device determines a first frequency offset parameter based on the detected first reference signal.

The reference signal may include at least one of a primary synchronization signal (PSS), a secondary synchronization signal (SSS), and a physical broadcast channel (PBCH), and a demodulation reference signal (DMRS) required for demodulating the PBCH.

The terminal device estimates a difference between a received signal center frequency and a local center frequency by using reference signals located on symbols at different time, and the difference can reflect a frequency offset of the received signal. By detecting a frequency difference value within a period of time, the terminal may obtain a change rate of a frequency that changes with time, and the change rate may reflect a change rate of a Doppler frequency offset of the received signal. In an initial access phase, a required frequency offset and a Doppler frequency offset change rate may be obtained by using a broadcast sequence signal, for example, a PSS, an SSS, and a CRS in an LTE system, and a PSS, an SSS, and a DRMS in a PBCH in a synchronization signal physical broadcast channel (SSB) block of an NR system. In a handover process, in addition to a pilot signal, the change rate of the frequency that changes with time may be further obtained by measuring channel state information (CSI)-reference signal (RS) of a target cell.

The frequency offset actually measured by the terminal device is a combination of the Doppler frequency offset, a local center frequency error of the terminal device, a center frequency error of the satellite base station, and a center frequency error of a transponder in a communication process, but values of other components are small. Therefore, the frequency offset actually measured by the terminal device may still reflect the Doppler frequency offset to some extent. After the terminal device accesses a network, through specific signaling interaction, the terminal device may obtain a more accurate Doppler frequency offset through measurement based on the reference signal and calculation based on information in signaling exchange. In addition, because the local center frequency error of the terminal device, the center frequency error of the satellite base station, and the center frequency error of the transponder in the communication process do not significantly change within a short period of time, a change rate of the frequency offset measured by the terminal device is almost completely equal to a change rate of the Doppler frequency offset that changes with time.

S350: The terminal device determines, based on whether the first frequency offset parameter is in the frequency offset parameter range, whether to access the first cell.

Optionally, S350 may be implemented in the following four manners.

Manner 1: Corresponding to the case 1, if the frequency configuration information indicates that the frequency offset parameter range of the first cell is that the frequency offset value is greater than the first frequency offset threshold, the first frequency offset parameter is a first frequency offset value. The terminal device needs to determine whether the first frequency offset value is greater than the first frequency offset threshold. The following cases are used for discussion.

(a) If the first frequency offset value is greater than a first frequency offset threshold, the terminal device accesses the first cell.

(b) If the first frequency offset value is less than or equal to the first frequency threshold, the terminal device does not access the first cell.

(c) If the first frequency offset value is less than or equal to the first frequency threshold, the terminal device further needs to determine, based on a change status of the frequency offset value, whether to access the first cell. The terminal device determines the first frequency offset value based on the detected first reference signal in S340. The terminal device may continue to detect a second reference signal to determine a second frequency offset value, and determine, based on a value relationship between an absolute value of the first frequency offset value and an absolute value of the second frequency offset value, whether to access the first cell. Optionally, the terminal device sequentially detects the first reference signal and the second reference signal. For example, the terminal device determines the first frequency offset value based on the detected first reference signal at a first moment, and the terminal device determines the second frequency offset value based on the detected second reference signal at a second moment. The first moment is earlier than the second moment. The case (c) is further classified into three cases:

(c1) The absolute value of the first frequency offset value is greater than the absolute value of the second frequency offset value. In this case, it indicates that the satellite base station is approaching the terminal device, and the terminal device accesses the first cell. In other words, even if the terminal device is located at an edge of the first cell, because the satellite base station is approaching the terminal device, the terminal device still accesses the first cell.

(c2) The absolute value of the first frequency offset value is less than the absolute value of the second frequency offset value. In this case, it indicates that the satellite base station is leaving the terminal device, and the terminal device does not access the first cell. In other words, because the terminal device is located at the edge of the first cell, and the satellite base station is leaving the terminal device, the terminal device does not access the first cell.

(c3) An absolute value of a first Doppler offset value is equal to an absolute value of a second Doppler offset value. In this case, it indicates that relative positions of the satellite base station and the terminal device almost remain unchanged, and the terminal device may choose to access the first cell or may choose not to access the first cell.

Manner 2: Corresponding to the case 1, if the frequency configuration information indicates that the frequency offset parameter range of the first cell is that the change rate of the frequency offset value that changes with time is greater than the first change rate threshold, in this case, the first frequency offset parameter is the first change rate, and the terminal device needs to determine whether the first change rate is greater than the first change rate threshold.

(a) If the first change rate is greater than the first change rate threshold, the terminal device accesses the first cell.

(b) If the first change rate is less than or equal to the first change rate threshold, the terminal device does not access the first cell.

(c) If the first change rate is less than or equal to the first change rate threshold, the terminal device further needs to determine, based on a case in which the frequency offset parameter range is a change status of the change rate of the frequency offset value that changes with time, whether to access the first cell. The terminal device determines the first change rate based on the detected first reference signal in S340. The terminal device may continue to detect the second reference signal to determine a second change rate, and determine, based on a value relationship between an absolute value of the first change rate and an absolute value of the second change rate, whether to access the first cell. Optionally, the terminal device sequentially detects the first reference signal and the second reference signal. For example, the terminal device determines the first change rate based on the detected first reference signal at the first moment, and the terminal device determines the second change rate based on the detected second reference signal at the second moment. The first moment is earlier than the second moment. The case (c) is further classified into three cases:

(c1) The absolute value of the first change rate is greater than the absolute value of the second change rate. In this case, it indicates that the satellite base station is approaching the terminal device, and the terminal device accesses the first cell. In other words, even if the terminal device is located at the edge of the first cell, because the satellite base station is approaching the terminal device, the terminal device still accesses the first cell.

(c2) The absolute value of the first change rate is less than the absolute value of the second change rate. In this case, it indicates that the satellite base station is leaving the terminal device, and the terminal device does not access the first cell. In other words, because the terminal device is located at the edge of the first cell, and the satellite base station is leaving the terminal device, the terminal device does not access the first cell.

(c3) The absolute value of a first change rate is equal to the absolute value of the second change rate. In this case, it indicates that the relative positions of the satellite base station and the terminal device almost remain unchanged, and the terminal device may choose to access the first cell or may choose not to access the first cell.

Manner 3: Corresponding to the case 2, if the configured frequency configuration information indicates that the frequency offset parameter range of the first cell is the intersection between the frequency offset value range and the change rate range of the frequency offset value that changes with time. The frequency offset value range is that a frequency offset parameter is greater than the second frequency offset threshold, and the change rate range of the frequency offset value that changes with time is greater than the second change rate threshold. In this case, the first frequency offset parameter is the first frequency offset value and the first change rate of the frequency offset value that changes with time. The terminal device needs to determine whether the first frequency offset value is greater than the second frequency offset threshold and whether the first change rate is greater than the second change rate threshold.

(a) If the first frequency offset value is greater than the second frequency offset threshold and the first change rate is also greater than the second change rate threshold, the terminal device accesses the first cell.

(b) If the first frequency offset value is less than or equal to the second frequency offset threshold, and/or the first change rate is less than or equal to the second change rate threshold, the terminal device does not access the cell.

(c) If the first frequency offset value is less than or equal to the second frequency offset threshold, and/or the first change rate is less than or equal to the second change rate threshold, the terminal device needs to further determine, based on a change status of the frequency offset parameter, whether to access the first cell. The terminal device determines the first change rate and the first frequency offset threshold based on the detected first reference signal in S340. The terminal device may continue to detect the second reference signal to determine the second change rate and the second frequency offset value, and determine, based on the value relationship between the absolute value of the first change rate and the absolute value of the second change rate, the absolute value of the first frequency offset, and the absolute value of the second frequency offset, whether to access the first cell. Optionally, the terminal device sequentially detects the first reference signal and the second reference signal. For example, the terminal device determines the first change rate and the first frequency offset value based on the detected first reference signal at the first moment, and the terminal device determines the second change rate and the second frequency offset value based on the detected second reference signal at the second moment. The first moment is earlier than the second moment. The case (c) is further classified into five cases:

(c1) The absolute value of the first change rate is greater than the absolute value of the second change rate, and the absolute value of the first frequency offset value is greater than the absolute value of the second frequency offset value. In this case, it indicates that the satellite base station is approaching the terminal device, and the terminal device accesses the first cell. In other words, even if the terminal device is located at the edge of the first cell, because the satellite base station is approaching the terminal device, the terminal device still accesses the first cell.

(c2) The absolute value of the first change rate is less than the absolute value of the second change rate, and the absolute value of the first frequency offset value is less than the absolute value of the second frequency offset value. In this case, it indicates that the satellite base station is leaving the terminal device, and the terminal device does not access the first cell. In other words, because the terminal device is located at the edge of the first cell, and the satellite base station is leaving the terminal device, the terminal device does not access the first cell.

(c3) The absolute value of a first change rate is equal to the absolute value of the second change rate, and the absolute value of the first frequency offset value is equal to the absolute value of the second frequency offset value. In this case, it indicates that the relative positions of the satellite base station and the terminal device almost remain unchanged, and the terminal device may choose to access the first cell or may choose not to access the first cell.

(c4) The absolute value of the first change rate is greater than or equal to the absolute value of the second change rate, and the absolute value of the first frequency offset value is less than the absolute value of the second frequency offset value. In this case, a movement direction of the satellite base station cannot be determined, and the first cell may not be accessed.

(c5) The absolute value of the first change rate is less than the absolute value of the second change rate, and the absolute value of the first frequency offset value is greater than or equal to the absolute value of the second frequency offset value. In this case, the movement direction of the satellite base station cannot be determined, and the first cell may not be accessed.

Manner 4: Corresponding to the case 3, if the configured frequency configuration information indicates that the frequency offset parameter range of the first cell is an intersection between the frequency offset value that is greater than a third frequency offset threshold and less than a fourth frequency offset threshold and the change rate of the frequency offset value that changes with time and that is greater than a third change rate threshold and less than a fourth change rate threshold. The frequency offset value is greater than the fourth frequency offset threshold. In this case, the first frequency offset parameter is the first frequency offset value and the first change rate of the frequency offset value that changes with time. The terminal device determines whether the first frequency offset value is greater than the third frequency offset threshold and less than the fourth frequency offset threshold, and whether a third change rate is greater than the third change rate threshold and less than the fourth change rate threshold. There are several cases (a), (b), (c), (d), and (e).

(a) If the first frequency offset value is greater than the third frequency offset threshold and less than the fourth frequency offset threshold, and the third change rate is greater than the third change rate threshold and less than the fourth change rate threshold, the terminal device accesses the first cell.

(b) If the first frequency offset value is less than or equal to the third frequency threshold, the terminal device does not access the first cell.

(c) If the third change rate is less than or equal to the third change rate threshold, or the third change rate is greater than or equal to the fourth change rate threshold, and the first frequency offset value is less than the fourth frequency offset threshold, the terminal device does not access the first cell.

(d) If the first frequency offset value is greater than the fourth frequency offset threshold, the terminal device accesses the first cell.

(e) If the first frequency offset value is less than or equal to the third frequency offset threshold, the third change rate is less than or equal to the third change rate threshold, or the third change rate is greater than or equal to the fourth change rate threshold, the terminal device needs to further determine, based on the change status of the frequency offset parameter, whether to access the first cell. The terminal device determines the first change rate and the first frequency threshold based on the detected first reference signal in S340. The terminal device may continue to detect the second reference signal to determine the second change rate and the second frequency offset value, and determine, based on the value relationship between the absolute value of the first change rate and the absolute value of the second change rate, the absolute value of the first frequency offset, and the absolute value of the second frequency offset, whether to access the first cell. Optionally, the terminal device sequentially detects the first reference signal and the second reference signal. For example, the terminal device determines the first change rate and the first frequency offset value based on the detected first reference signal at the first moment, and the terminal device determines the second change rate and the second frequency offset value based on the detected second reference signal at the second moment. The first moment is earlier than the second moment. The case (e) is further classified into five cases:

(e1) The absolute value of the first change rate is greater than the absolute value of the second change rate, and the absolute value of the first frequency offset value is greater than the absolute value of the second frequency offset value. In this case, it indicates that the satellite base station is approaching the terminal device, and the terminal device accesses the first cell. In other words, even if the terminal device is located at the edge of the first cell, because the satellite base station is approaching the terminal device, the terminal device still accesses the first cell.

(e2) The absolute value of the first change rate is less than the absolute value of the second change rate, and the absolute value of the first frequency offset value is less than the absolute value of the second frequency offset value. In this case, it indicates that the satellite base station is leaving the terminal device, and the terminal device does not access the first cell. In other words, because the terminal device is located at the edge of the first cell, and the satellite base station is leaving the terminal device, the terminal device does not access the first cell.

(e3) The absolute value of a first change rate is equal to the absolute value of the second change rate, and the absolute value of the first frequency offset value is equal to the absolute value of the second frequency offset value. In this case, it indicates that the relative positions of the satellite base station and the terminal device almost remain unchanged, and the terminal device may choose to access the first cell or may choose not to access the first cell.

(e4) The absolute value of the first change rate is greater than or equal to the absolute value of the second change rate, and the absolute value of the first frequency offset value is less than the absolute value of the second frequency offset value. In this case, the movement direction of the satellite base station cannot be determined, and the first cell may not be accessed.

(e5) The absolute value of the first change rate is less than the absolute value of the second change rate, and the absolute value of the first frequency offset value is greater than or equal to the absolute value of the second frequency offset value. In this case, the movement direction of the satellite base station cannot be determined, and the first cell may not be accessed.

Manner 5: Corresponding to the case 4, if the configured frequency configuration information indicates that the frequency offset parameter range of the first cell is the intersection between the frequency offset value range and the change rate range of the frequency offset value that changes with time. The frequency offset value range is that a frequency offset parameter is greater than a fifth frequency offset threshold, and the change rate range of the frequency offset value that changes with time is less than a fifth change rate threshold. In this case, the first frequency offset parameter is the first frequency offset value and the first change rate of the frequency offset value that changes with time. The terminal device needs to determine whether the first frequency offset value is greater than the fifth frequency offset threshold and whether the first change rate is less than the fifth change rate threshold.

(a) If the first frequency offset value is greater than the fifth frequency offset threshold and the first change rate is also less than the fifth change rate threshold, the terminal device accesses the first cell.

(b) If the first frequency offset value is less than or equal to the fifth frequency offset threshold, and/or the first change rate is greater than or equal to the fifth change rate threshold, the terminal device does not access the cell.

(c) If the first frequency offset value is less than or equal to the fifth frequency offset threshold, and/or the first change rate is greater than or equal to the fifth change rate threshold, the terminal device needs to further determine, based on a change status of the frequency offset parameter, whether to access the first cell. The terminal device determines the first change rate and the first frequency threshold based on the detected first reference signal in S340. The terminal device may continue to detect the second reference signal to determine the second change rate and the second frequency offset value, and determine, based on the value relationship between the absolute value of the first change rate and the absolute value of the second change rate, the absolute value of the first frequency offset, and the absolute value of the second frequency offset, whether to access the first cell. Optionally, the terminal device sequentially detects the first reference signal and the second reference signal. For example, the terminal device determines the first change rate and the first frequency offset value based on the detected first reference signal at the first moment, and the terminal device determines the second change rate and the second frequency offset value based on the detected second reference signal at the second moment. The first moment is earlier than the second moment. The case (c) is further classified into five cases:

(c1) The absolute value of the first change rate is less than the absolute value of the second change rate, and the absolute value of the first frequency offset value is greater than the absolute value of the second frequency offset value. In this case, it indicates that the satellite base station is approaching the terminal device, and the terminal device accesses the first cell. In other words, even if the terminal device is located at the edge of the first cell, because the satellite base station is approaching the terminal device, the terminal device still accesses the first cell.

(c2) The absolute value of the first change rate is greater than the absolute value of the second change rate, and the absolute value of the first frequency offset value is less than the absolute value of the second frequency offset value. In this case, it indicates that the satellite base station is leaving the terminal device, and the terminal device does not access the first cell. In other words, because the terminal device is located at the edge of the first cell, and the satellite base station is leaving the terminal device, the terminal device does not access the first cell.

(c3) The absolute value of a first change rate is equal to the absolute value of the second change rate, and the absolute value of the first frequency offset value is equal to the absolute value of the second frequency offset value. In this case, it indicates that the relative positions of the satellite base station and the terminal device almost remain unchanged, and the terminal device may choose to access the first cell or may choose not to access the first cell.

(c4) The absolute value of the first change rate is less than or equal to the absolute value of the second change rate, and the absolute value of the first frequency offset value is less than the absolute value of the second frequency offset value. In this case, the movement direction of the satellite base station cannot be determined, and the first cell may not be accessed.

(c5) The absolute value of the first change rate is greater than the absolute value of the second change rate, and the absolute value of the first frequency offset value is less than or equal to the absolute value of the second frequency offset value. In this case, the movement direction of the satellite base station cannot be determined, and the first cell may not be accessed.

Manner 6: Corresponding to the case 5, if the frequency configuration information indicates that the frequency offset parameter range of the first cell is that the change rate of the frequency offset value that changes with time is less than a sixth change rate threshold, in this case, the first frequency offset parameter is the first change rate, and the terminal device needs to determine whether the first change rate is less than the sixth change rate threshold.

(a) If the first change rate is less than the sixth change rate threshold, the terminal device accesses the first cell.

(b) If the first change rate is greater than or equal to the sixth change rate threshold, the terminal device does not access the first cell.

(c) If the first change rate is greater than or equal to the first change rate threshold, the terminal device further needs to determine, based on a case in which the frequency offset parameter range is a change status of the change rate of the frequency offset value that changes with time, whether to access the first cell. The terminal device determines the first change rate based on the detected first reference signal in S340. The terminal device may continue to detect the second reference signal to determine a second change rate, and determine, based on a value relationship between an absolute value of the first change rate and an absolute value of the second change rate, whether to access the first cell. Optionally, the terminal device sequentially detects the first reference signal and the second reference signal. For example, the terminal device determines the first change rate based on the detected first reference signal at the first moment, and the terminal device determines the second change rate based on the detected second reference signal at the second moment. The first moment is earlier than the second moment. The case (c) is further classified into three cases:

(c1) The absolute value of the first change rate is less than the absolute value of the second change rate. In this case, it indicates that the satellite base station is approaching the terminal device, and the terminal device accesses the first cell. In other words, even if the terminal device is located at the edge of the first cell, because the satellite base station is approaching the terminal device, the terminal device still accesses the first cell.

(c2) The absolute value of the first change rate is greater than the absolute value of the second change rate. In this case, it indicates that the satellite base station is leaving the terminal device, and the terminal device does not access the first cell. In other words, because the terminal device is located at the edge of the first cell, and the satellite base station is leaving the terminal device, the terminal device does not access the first cell.

(c3) The absolute value of a first change rate is equal to the absolute value of the second change rate. In this case, it indicates that the relative positions of the satellite base station and the terminal device almost remain unchanged, and the terminal device may choose to access the first cell or may choose not to access the first cell.

It should be noted that in this embodiment of this application, a range of the first frequency offset parameter and that of a Doppler offset parameter is unified. In other words, for the case 1, the first frequency offset parameter is the first frequency offset value or a first change rate of a Doppler offset value that changes with time. For the cases 2, 3, and 4, the first frequency offset parameter is the first frequency offset value and the first change rate of the frequency offset value that changes with time. For the case 5, the first frequency offset parameter is the first change rate of the frequency offset value that changes with time.

It should be noted that, in this embodiment of this application, that the terminal device accesses the first cell may be understood as that the terminal device initiates random access to the first cell, or the terminal device establishes a radio resource control (RRC) connection to the first cell, or access is initiated because of cell handover.

Figure 10:
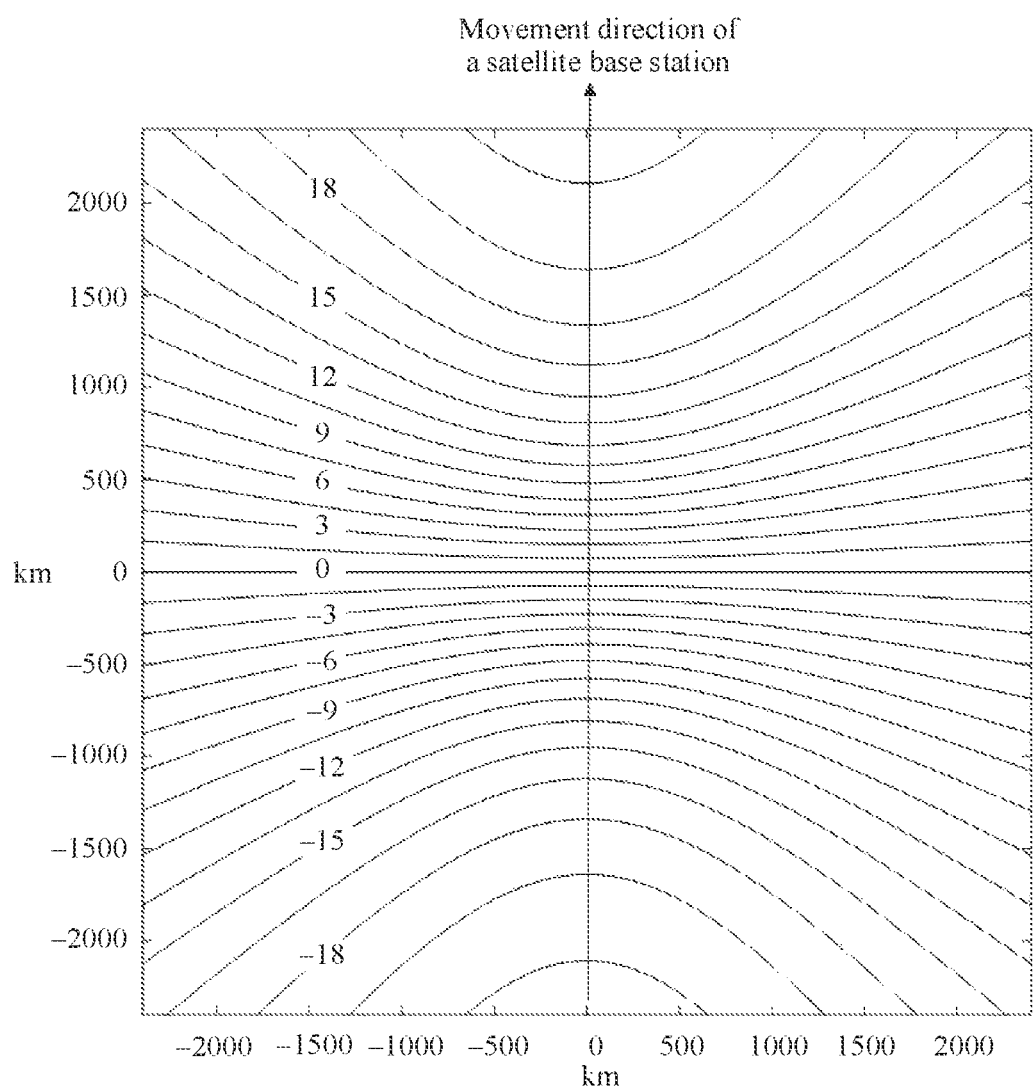
FIG. 10 is a schematic diagram of an equal-frequency offset value line according to an embodiment of this application.
Figure 11:
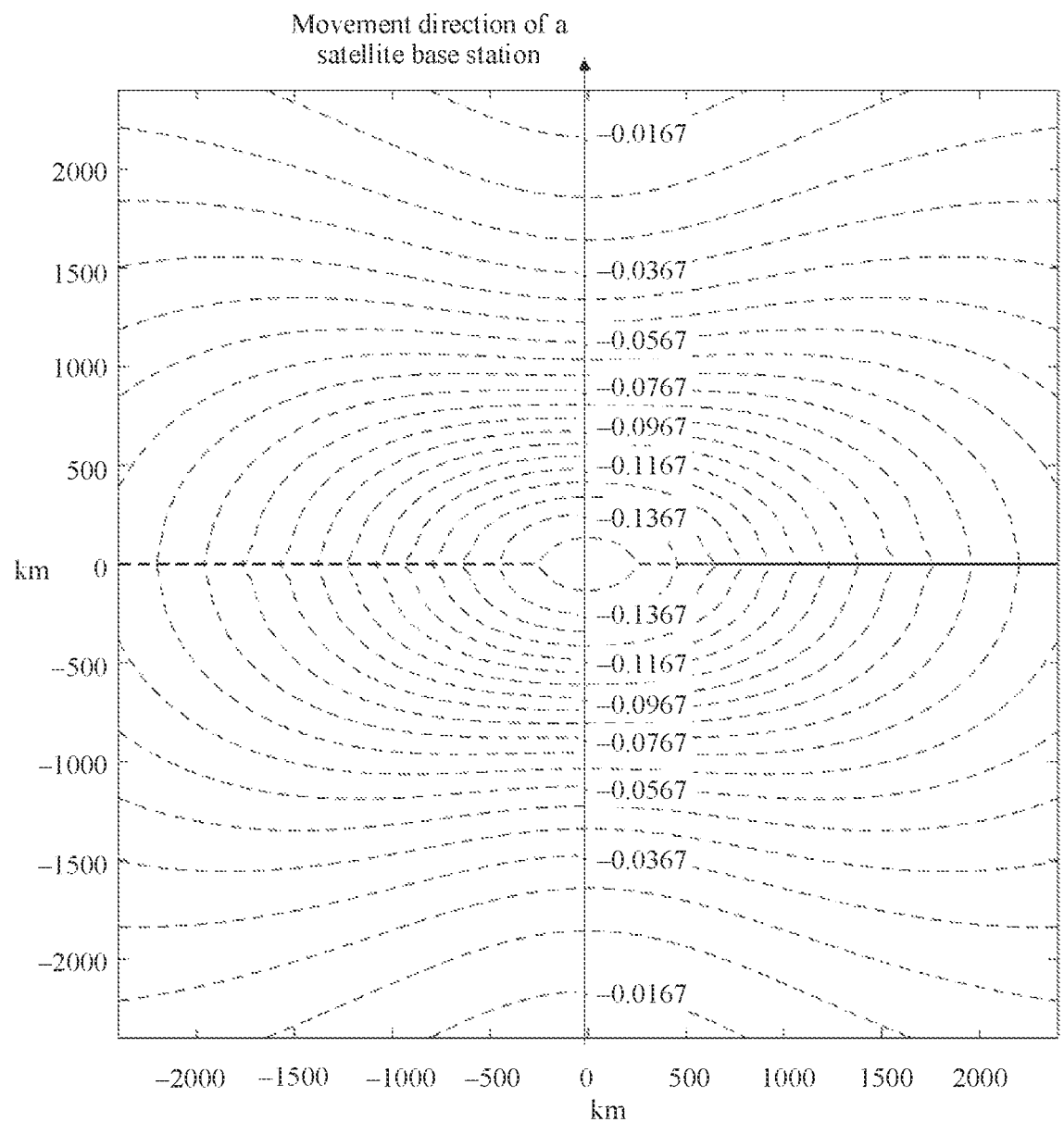
FIG. 11 is a schematic diagram of an equal-frequency change rate line according to an embodiment of this application.

To better describe the value relationship mentioned in the embodiments of this application, FIG. 10 shows an equal-Doppler offset line (also referred to as an equal-frequency offset line), and a unit is a frequency deviation (ppm). Numbers on the solid line in FIG. 8 indicate a value relationship of Doppler offset values. FIG. 11 shows an equal-Doppler change rate line (also referred to as an equal-frequency change rate line), and a unit is ppm/s. Numbers on a dashed line in FIG. 11 indicate a value relationship of Doppler values that change with time, and numbers in FIG. 11 are preceded by a minus sign (−). To be specific, in FIG. 10, an order from bottom to top is from small to large (from negative to positive). In FIG. 11, all tick marks are negative numbers. Below an abscissa, an order from bottom to top is from large to small, and corresponding absolute values are from small to large. Above the abscissa, an order from bottom to top is from small to large, and corresponding absolute values are from large to small.

It should also be noted that a frequency changes due to a Doppler effect. In this application, a frequency and a Doppler may be replaced. For example, a frequency offset may alternatively be a Doppler value offset, and a frequency offset parameter range may alternatively be a Doppler offset parameter range.

It should be noted that dots in the coordinate systems in FIG. 4 to FIG. 11 are points at which the satellite base station is projected onto the ground.

The foregoing describes in detail the access method provided in the embodiments of this application with reference to FIG. 1 to FIG. 11. The following describes in detail an access apparatus provided in the embodiments of this application with reference to FIG. 12 to FIG. 14.

Figure 12:
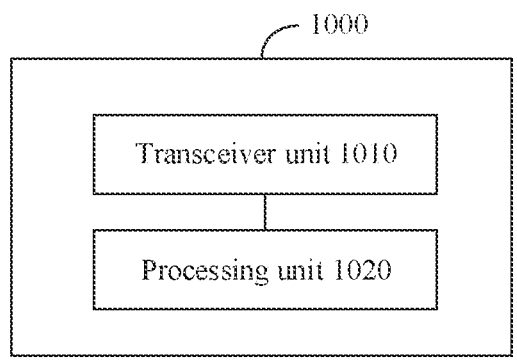
FIG. 12 is a schematic block diagram of an access apparatus according to an embodiment of this application.

FIG. 12 shows a schematic block diagram of an access apparatus 1000 according to an embodiment of this application. The apparatus 1000 may correspond to the terminal device described in the foregoing method, or may correspond to a chip or a component of the terminal device. Modules or units in the apparatus 1000 may be separately configured to perform actions or processing processes performed by the terminal device in the foregoing method. As shown in FIG. 12, the apparatus 1000 for satellite communication may include a transceiver unit 1010 and a processing unit 1020.

The transceiver unit 1010 is configured to receive frequency configuration information 27, sent by a satellite base station by using a first cell. The frequency configuration information indicates a frequency offset parameter range of the first cell.

The processing unit 1020 is configured to determine the frequency offset parameter range of the first cell based on the frequency configuration information; determine a first frequency offset parameter based on a detected first reference signal; and determine, based on whether the first frequency offset parameter is in the frequency offset parameter range, whether to access the first cell.

In an optional embodiment, the processing unit 1020 is configured to: if the first frequency offset parameter is in the frequency offset parameter range, access the first cell; and if the first frequency offset parameter is not in the frequency offset parameter range, not access the first cell.

In an optional embodiment, the processing unit 1020 is further configured to determine a second frequency offset parameter based on a detected second reference signal.

The processing unit 1020 is configured to: if the first frequency offset parameter is not in the frequency offset parameter range, determine, based on a value relationship between an absolute value of the first frequency offset parameter and an absolute value of the second frequency offset parameter, whether to access the first cell.

In an optional implementation, the frequency configuration information indicates that the frequency offset parameter range of the first cell is a frequency offset value range and/or a change rate range of a frequency offset value that changes with time.

In an optional embodiment, if the frequency configuration information indicates that the frequency offset parameter range of the first cell is the frequency offset value range, the frequency offset value range is that the frequency offset value is greater than a first frequency offset threshold, and the first frequency offset parameter is a first frequency offset value.

The processing unit 1020 is configured to determine, based on the frequency configuration information, that the first frequency offset parameter range is greater than the first frequency offset threshold.

In an optional implementation, if the frequency configuration information indicates that the frequency offset parameter range of the first cell is the change rate range of the frequency offset value that changes with time, the change rate range is greater than a first change rate threshold, and the first frequency offset parameter is a first change rate of the frequency offset value that changes with time.

The processing unit 1020 is configured to determine, based on the frequency configuration information, that the first frequency offset parameter range is greater than the first change rate threshold.

In an optional implementation, the frequency configuration information indicates that the frequency offset parameter range of the first cell is an intersection between the frequency offset value range and the change rate range of the frequency offset value that changes with time. The frequency offset value range is that the frequency offset value is greater than a second frequency offset threshold, and the change rate range of the frequency offset value that changes with time is greater than a second change rate threshold. The first frequency offset parameter is the first frequency offset value and the first change rate of the frequency offset value that changes with time.

The processing unit 1020 is configured to determine, based on the frequency configuration information, that the first frequency offset parameter range is an intersection between the frequency offset value that is greater than the second frequency offset threshold and the change rate value of the frequency offset value that changes with time and that is greater than the second change rate threshold.

In an optional implementation, the frequency configuration information indicates that the frequency offset parameter range of the first cell is an intersection between the frequency offset value that is greater than a third frequency offset threshold and less than a fourth frequency offset threshold and the change rate of the frequency offset value that changes with time and that is greater than a third change rate threshold and less than a fourth change rate threshold. The frequency offset value is greater than the fourth frequency offset threshold. The first frequency offset parameter is the first frequency offset value and the first change rate of the frequency offset value that changes with time.

The processing unit 1020 is configured to determine, based on the frequency configuration information, that the first frequency offset parameter range is the intersection between the frequency offset value that is greater than the third frequency offset threshold and less than the fourth frequency offset threshold and the change rate of the frequency offset value that changes with time and that is greater than the third change rate threshold and less than the fourth change rate threshold, and the frequency offset value is greater than the fourth frequency offset threshold.

It should be understood that, for a specific process in which the units in the apparatus 1000 perform the foregoing corresponding steps, refer to the foregoing description with reference to the method embodiments in FIG. 3 to FIG. 11. For brevity, details are not described herein again.

Figure 13:
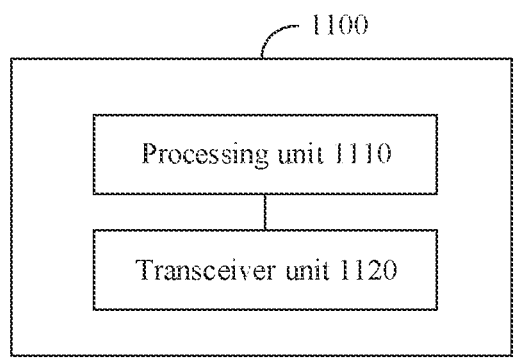
FIG. 13 is a schematic block diagram of another access apparatus according to an embodiment of this application.

FIG. 13 shows a schematic block diagram of an access apparatus 1100 according to an embodiment of this application. The apparatus 1100 may correspond to the satellite base station described in the foregoing method, or may correspond to a chip or component of the satellite base station. Modules or units in the apparatus 1100 may be separately configured to perform actions or processing processes performed by the satellite base station in the foregoing method. As shown in FIG. 13, the access apparatus 1100 may include a processing unit 1110 and a transceiver unit 1120.

The processing unit 1110 is configured to determine frequency configuration information of a first cell in at least one cell. The frequency configuration information of the first cell indicates a frequency offset parameter range of the first cell.

The transceiver unit 1120 is configured to send the frequency configuration information of the first cell to a terminal device in the first cell by using the first cell.

In an optional implementation, the frequency configuration information indicates that the frequency offset parameter range of the first cell is a frequency offset value range and/or a change rate range of a frequency offset value that changes with time.

In an optional implementation, if the frequency configuration information indicates that the frequency offset parameter range of the first cell is the frequency offset value range, the frequency offset value range is that the frequency offset value is greater than a first frequency offset threshold.

In an optional implementation, if the frequency configuration information indicates that the frequency offset parameter range of the first cell is the change rate range of the frequency offset value that changes with time, the change rate range of the frequency offset value that changes with time is greater than a first change rate threshold.

In an optional implementation, the frequency configuration information indicates that the frequency offset parameter range of the first cell is an intersection between the frequency offset value range and the change rate range of the frequency offset value that changes with time.

The frequency offset value range is greater than a second frequency offset threshold, and the change rate range of the frequency offset value that changes with time is greater than a second change rate threshold.

In an optional implementation, the frequency configuration information indicates that the frequency offset parameter range of the first cell is an intersection between the frequency offset value that is greater than a third frequency offset threshold and less than a fourth frequency offset threshold and the change rate of the frequency offset value that changes with time and that is greater than a third change rate threshold and less than a fourth change rate. The frequency offset value is greater than the fourth frequency offset threshold.

It should be understood that, for a specific process in which the units in the apparatus 1100 perform the foregoing corresponding steps, refer to the foregoing description with reference to the method embodiments in FIG. 3 to FIG. 11. For brevity, details are not described herein again.

The apparatus 1000 in the foregoing solutions has functions of implementing corresponding steps performed by the terminal device in the foregoing method, and the apparatus 1100 in the foregoing solutions has functions of implementing corresponding steps performed by the satellite base station in the foregoing method. The functions may be implemented by hardware, or may be implemented by hardware executing corresponding software. The hardware or the software includes one or more modules corresponding to the foregoing function. For example, the sending unit may alternatively be a transmitter, the receiving unit may alternatively be a receiver, and another unit such as a determining unit may alternatively be a processor, to respectively perform a sending operation, a receiving operation, and a related processing operation in the method embodiments.

In a specific implementation process, the processor may be configured to perform, for example, but not limited to, baseband related processing, and the transceiver may be configured to perform, for example, but not limited to, radio frequency receiving and sending. The foregoing components may be separately disposed on chips independent of each other, or at least some or all of the components may be disposed on one chip. For example, the processor may be further classified into an analog baseband processor and a digital baseband processor. The analog baseband processor and the transceiver may be integrated into a same chip, and the digital baseband processor may be disposed on a standalone chip. With continuous development of integrated circuit technologies, an increasing quantity of components may be integrated on one chip. For example, the digital baseband processor and a plurality of application processors (for example, but not limited to a graphics processing unit and a multimedia processor) may be integrated into one chip. Such a chip may be referred to as a system on chip (SOC). Whether to separately dispose the components on different chips or integrate the components into one or more chips depends on a specific product design requirement. Specific implementations of the foregoing components are not limited in this embodiment of this application.

Figure 14:
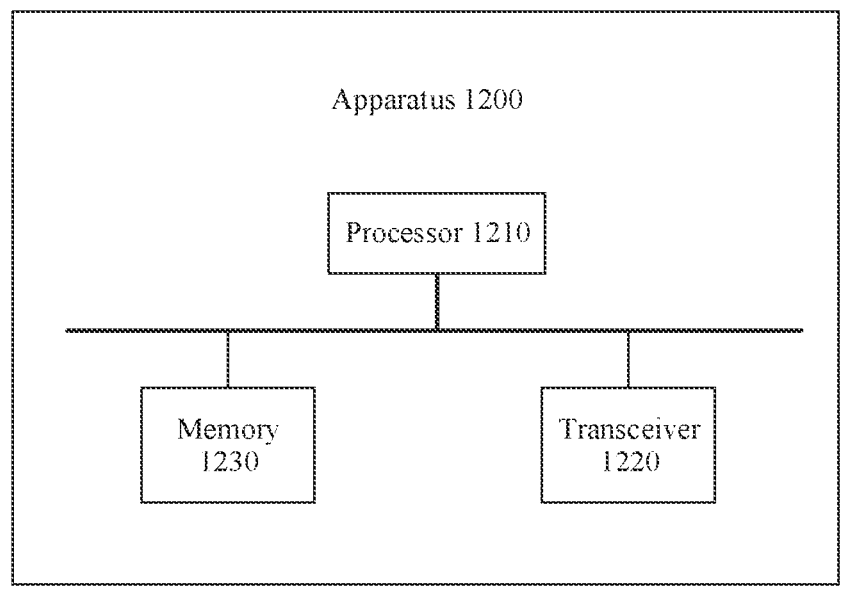
FIG. 14 is a schematic block diagram of still another access apparatus according to an embodiment of this application.

It may be understood that the processor in the foregoing embodiments may execute program instructions by using a hardware platform having a processor and a communication interface, to separately implement functions of the processor in any design in the foregoing embodiments of this application. Based on this, as shown in FIG. 14, an embodiment of this application provides a schematic block diagram of an access apparatus 1200. The apparatus 1200 includes a processor 1210, a transceiver 1220, and a memory 1230. The processor 1210, the transceiver 1220, and the memory 1230 communicate with each other through an internal connection path. The memory 1230 is configured to store an instruction. The processor 1210 is configured to execute the instruction stored in the memory 1230, to control the transceiver 1220 to send a signal and/or receive a signal.

In a possible implementation, if the apparatus 1200 is a terminal device, the transceiver 1220 is configured to receive frequency configuration information sent by a satellite base station by using a first cell. The frequency configuration information indicates a frequency offset parameter range of the first cell. The processor 1210 is configured to determine the frequency offset parameter range of the first cell based on the frequency configuration information. The processor 1210 is further configured to determine a first frequency offset parameter based on a detected first reference signal. The processor 1210 is further configured to determine, based on whether the first frequency offset parameter is in the frequency offset parameter range, whether to access the first cell.

In another possible implementation, if the apparatus 1200 is a satellite base station, the processor 1210 is configured to determine frequency configuration information of a first cell in at least one cell. The frequency configuration information of the first cell indicates a frequency offset parameter range of the first cell. The transceiver 1220 is configured to send the frequency configuration information of the first cell to a terminal device in the first cell by using the first cell.

It should be understood that the apparatus 1000 in FIG. 12 and the apparatus 1100 in FIG. 13 in the embodiments of this application may be implemented by using the apparatus 1200 in FIG. 14, and may be configured to perform steps and/or procedures corresponding to the terminal device and the satellite base station in the foregoing method embodiments.

It may be understood that the methods, the procedures, the operations, or the steps in the designs described in the embodiments of this application can be implemented in a one-to-one correspondence manner by using computer software, electronic hardware, or a combination of computer software and electronic hardware. Whether these functions are performed in a hardware manner or a software manner depends on specific application and a design constraint of the technical solutions. For example, in consideration of aspects such as good universality, low costs, and decoupling between software and hardware, these functions may be implemented by executing program instructions. For another example, in consideration of aspects such as system performance and reliability, these functions may be implemented by using a dedicated circuit. A person of ordinary skill in the art may implement the described functions by using different methods for each particular application. This is not limited herein.

According to the method provided in the embodiments of this application, this application further provides a computer program product. The computer program product includes computer program code. When the computer program code is run on a computer, the computer performs the method in the foregoing embodiments. The embodiments in this application may also be combined with each other.

According to the methods provided in the embodiments of this application, this application further provides a computer-readable medium. The computer-readable medium stores program code. When the program code is run on a computer, the computer is enabled to perform the methods in the foregoing embodiments.

In the embodiments of this application, it should be noted that the foregoing method embodiments in the embodiments of this application may be applied to a processor, or may be implemented by a processor. The processor may be an integrated circuit chip and has a signal processing capability. In an implementation process, the steps in the foregoing method embodiments may be implemented by using a hardware integrated logic circuit in the processor or instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processing apparatus may implement or perform the methods, steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (rRAM) that is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be understood that serial numbers of the foregoing processes do not mean execution sequences in the embodiments of this application. The execution sequences of the processes should be determined according to functions and internal logic of the processes, and should not be construed as any limitation on the implementation processes of the embodiments of this application.

The terms "first", "second", and the like in this application are merely used to distinguish different objects, and "first" and "second" do not limit an actual sequence or functions of objects modified by "first" and "second". Any embodiment or design solution described as "example", "for example", "such as", "optionally", or "in some implementations" in this application should not be construed as being more preferred or more advantageous than another embodiment or design. Using these words is intended to present a related concept in detail.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

All or some of the foregoing embodiments may be implemented by using software, hardware, firmware, or any combination thereof. When being implemented by using the software, all or some of the methods may be implemented in a form of a computer program product. The computer program product may include one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any available medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, in other words, may be located at one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An access method, comprising:
receiving, by a terminal device, frequency configuration information sent by a satellite base station by using a first cell, wherein the frequency configuration information indicates a frequency offset parameter range of the first cell;
determining, by the terminal device, the frequency offset parameter range of the first cell based on the frequency configuration information;
determining, by the terminal device, a first frequency offset parameter based on a detected first reference signal; and
determining, by the terminal device based on whether the first frequency offset parameter is in the frequency offset parameter range, whether to access the first cell.

2. The method according to claim 1, wherein determining whether to access the first cell comprises:
in response to determining that the first frequency offset parameter is in the frequency offset parameter range, accessing, by the terminal device, the first cell; and
in response to determining that the first frequency offset parameter is not in the frequency offset parameter range, not accessing, by the terminal device, the first cell.

3. The method according to claim 1, wherein the method further comprises:
determining, by the terminal device, a second frequency offset parameter based on a detected second reference signal; and
wherein determining whether to access the first cell comprises:
in response to determining that the first frequency offset parameter is not in the frequency offset parameter range, determining, by the terminal device based on a value relationship between an absolute value of the first frequency offset parameter and an absolute value of the second frequency offset parameter, whether to access the first cell.

4. The method according to claim 1, wherein the frequency configuration information indicates that the frequency offset parameter range of the first cell is at least one of a frequency offset value range or a change rate range of a frequency offset value that changes with time.

5. The method according to claim 4, wherein upon determining that the frequency configuration information indicates that the frequency offset parameter range of the first cell is the frequency offset value range, the frequency offset value is greater than a first frequency offset threshold, and the first frequency offset parameter is a first frequency offset value; and
wherein determining the frequency offset parameter range of the first cell based on the frequency configuration information comprises:
determining, by the terminal device based on the frequency configuration information, that the frequency offset parameter range is greater than the first frequency offset threshold.

6. The method according to claim 4, wherein upon determining that the frequency configuration information indicates that the frequency offset parameter range of the first cell is the change rate range of the frequency offset value that changes with time, the change rate range is greater than a first change rate threshold, and the first frequency offset parameter is a first change rate of the frequency offset value that changes with time; and
wherein determining the frequency offset parameter range of the first cell based on the frequency configuration information comprises:
determining, by the terminal device based on the frequency configuration information, that the frequency offset parameter range is greater than the first change rate threshold.

7. The method according to claim 4, wherein:
the frequency configuration information indicates that the frequency offset parameter range of the first cell is an intersection between the frequency offset value range and the change rate range of the frequency offset value that changes with time;
the frequency offset value range is that the frequency offset value is greater than a second frequency offset threshold, and the change rate range of the frequency offset value that changes with time is greater than a second change rate threshold; and
the first frequency offset parameter is a first frequency offset value and a first change rate of the frequency offset value that changes with time; and
wherein determining the frequency offset parameter range of the first cell based on the frequency configuration information comprises:
determining, by the terminal device based on the frequency configuration information, that the frequency offset parameter range is an intersection between the frequency offset value that is greater than the second frequency offset threshold and a change rate of the frequency offset value that changes with time and that is greater than the second change rate threshold.

8. The method according to claim 1, wherein the frequency configuration information indicates that the frequency offset parameter range of the first cell is an intersection between a frequency offset value, that is greater than a third frequency offset threshold and less than a fourth frequency offset threshold, and a change rate of the frequency offset value, that changes with time and that is greater than a third change rate threshold and less than a fourth change rate threshold, the frequency offset value is greater than the fourth frequency offset threshold, and the first frequency offset parameter is a first frequency offset value and a first change rate of the frequency offset value that changes with time; and
wherein determining the frequency offset parameter range of the first cell based on the frequency configuration information comprises:
determining, by the terminal device based on the frequency configuration information, that the frequency offset parameter range is the intersection between the frequency offset value, that is greater than the third frequency offset threshold and less than the fourth frequency offset threshold, and the change rate of the frequency offset value, that changes with time and that is greater than the third change rate threshold and less than the fourth change rate threshold, and the frequency offset value is greater than the fourth frequency offset threshold.

9. An access method, comprising:
determining, by a satellite base station, frequency configuration information of a first cell in at least one cell, wherein the satellite base station configures different frequency configuration information for different cells, wherein the frequency configuration information of the first cell indicates that a frequency offset parameter range of the first cell is at least one of a frequency offset value range or a change rate range of a frequency offset value that changes with time, and wherein:

upon determining that the frequency configuration information indicates that the frequency offset parameter range of the first cell is the frequency offset value range, the frequency offset value is greater than a first frequency offset threshold; or upon determining that the frequency configuration information indicates that the frequency offset parameter range of the first cell is the change rate range of the frequency offset value that changes with time, the change rate range of the frequency offset value that changes with time is greater than a first change rate threshold; and sending, by the satellite base station, the frequency configuration information of the first cell to a terminal device in the first cell by using the first cell.

10. The method according to claim 9, wherein:
the frequency configuration information indicates that the frequency offset parameter range of the first cell is an intersection between the frequency offset value range and the change rate range of the frequency offset value that changes with time; and
the frequency offset value range is greater than a second frequency offset threshold, and the change rate range of the frequency offset value that changes with time is greater than a second change rate threshold.

11. The method according to claim 9, wherein the frequency configuration information indicates that the frequency offset parameter range of the first cell is an intersection between a frequency offset value that is greater than a third frequency offset threshold and less than a fourth frequency offset threshold and a change rate of a frequency offset value that changes with time and that is greater than a third change rate threshold and less than a fourth change rate, and the frequency offset value is greater than the fourth frequency offset threshold.

12. An access apparatus, comprising:
at least one interface;
at least one processor, wherein the at least one interface is coupled to the at least one processor; and
one or more memories coupled to the at least one processor and storing programming instructions for execution by the at least one processor to:
receive frequency configuration information sent by a satellite base station by using a first cell, wherein the frequency configuration information indicates a frequency offset parameter range of the first cell; and
determine the frequency offset parameter range of the first cell based on the frequency configuration information;
determine a first frequency offset parameter based on a detected first reference signal; and
determine, based on whether the first frequency offset parameter is in the frequency offset parameter range, whether to access the first cell.

13. The apparatus according to claim 12, wherein the programming instructions are for execution by the at least one processor to:
in response to determining that the first frequency offset parameter is in the frequency offset parameter range, access the first cell; and
in response to determining that the first frequency offset parameter is not in the frequency offset parameter range, not accessing the first cell.

14. The apparatus according to claim 12, wherein the programming instructions are for execution by the at least one processor to:
determine a second frequency offset parameter based on a detected second reference signal; and
in response to determining that the first frequency offset parameter is not in the frequency offset parameter range, determine, based on a value relationship between an absolute value of the first frequency offset parameter and an absolute value of the second frequency offset parameter, whether to access the first cell.

15. The apparatus according to claim 12, wherein the frequency configuration information indicates that the frequency offset parameter range of the first cell is at least one of a frequency offset value range or a change rate range of a frequency offset value that changes with time.

16. The apparatus according to claim 15, wherein if the frequency configuration information indicates that the frequency offset parameter range of the first cell is the frequency offset value range, the frequency offset value is greater than a first frequency offset threshold, and the first frequency offset parameter is a first frequency offset value; and
wherein the programming instructions are for execution by the at least one processor to determine, based on the frequency configuration information, that the frequency offset parameter range is greater than the first frequency offset threshold.

17. The apparatus according to claim 15, wherein if the frequency configuration information indicates that the frequency offset parameter range of the first cell is the change rate range of the frequency offset value that changes with time, the change rate range is greater than a first change rate threshold, and the first frequency offset parameter is a first change rate of the frequency offset value that changes with time; and
wherein the programming instructions are for execution by the at least one processor to determine, based on the frequency configuration information, that the frequency offset parameter range is greater than the first change rate threshold.

* * * * *